United States Patent [19]

Sack et al.

[11] Patent Number: 4,659,108

[45] Date of Patent: Apr. 21, 1987

[54] AUTOMATIC SEAT BELT ADJUSTING SYSTEM

[75] Inventors: John J. Sack, Bloomfield Hills, Mich.; Nazareth Stamboulian, Van Nuys; Akira Tanaka, Northridge, both of Calif.

[73] Assignee: American Safety Equipment Corp., Troy, Mich.

[21] Appl. No.: 774,952

[22] Filed: Sep. 11, 1985

[51] Int. Cl.⁴ .............................................. B60R 21/10
[52] U.S. Cl. ..................................... 280/807; 180/268; 297/474
[58] Field of Search ........................ 280/801, 807, 808; 180/268, 269, 270; 297/468, 474, 477, 483

[56] References Cited

U.S. PATENT DOCUMENTS

| | | | |
|---|---|---|---|
| 3,912,035 | 10/1975 | Ulert | 180/268 |
| 4,261,530 | 4/1981 | Asai et al. | 180/268 |
| 4,489,804 | 12/1984 | Kamijo | 180/268 |
| 4,519,652 | 5/1985 | Kamijo | 180/268 |
| 4,529,143 | 7/1985 | Kanada et al. | 280/807 |
| 4,534,441 | 8/1985 | Kamijo et al. | 180/268 |
| 4,569,536 | 2/1986 | Tsuge et al. | 280/807 |

FOREIGN PATENT DOCUMENTS

2153658 8/1985 United Kingdom .
2153203 8/1985 United Kingdom .

Primary Examiner—John J. Love
Assistant Examiner—Kenneth R. Rice
Attorney, Agent, or Firm—Poms, Smith, Lande & Rose

[57] ABSTRACT

A seat belt system of the conventional three point restraint type includes an electric motor which replaces the usual rewind spring on the belt retractor. When the seat belt is buckled up, the motor is set into operation and pulls the shoulder belt up into engagement with the body of the occupant in the seat, and then is pulsed backward to provide safe tensionless comfort in which the seat belt is located close to the body of the person being restrained but safely spaced away from the body of the occupant. The cycle of tightening of the belt and then releasing it by a predetermined short distance to provide the tensionless comfort position is repeated whenever the occupant either closes the seat belt buckle, shifts the position of the seat by operating the seat release or seat reclining levers, or leans forward beyond the tensionless range, thereby applying tension to the seat belt. The motor may be pulsed backward by a capacitor, or other means in combination with a switching circuit which applies a reverse pulse from such capacitor or other means to the motor, following tightening up of the belt. The system includes a seat sensor means, a belt tension sensor means, a vehicle speed sensor means for causing re-check of belt tension, and a system operation signal light.

13 Claims, 8 Drawing Figures

AUTOMATIC SEAT BELT ADJUSTING SYSTEM

FIELD OF THE INVENTION

The present invention relates to seat belt systems including a safe tensionless comfort feature.

BACKGROUND OF THE INVENTION

Currently available seat belts of the conventional three point type may be provided with tensionless comfort features requiring manual operation by the occupant being restrained. Thus, when one initially buckles up the seat belt, the shoulder belt will be drawn up with a high degree of tension, across the body. Then, by pulling on the belt, an unspecifiable amount of belt slack may be introduced to provide tensionless comfort, with the belt temporarily latched into a position where it is spaced away from the body of the occupant.

Once an occupant is in the tensionless comfort position, a number of actions may occur that could result in a potentially unsafe driving adjustment for the seat belt, where the belt is spaced a considerable distance away from the body of the occupant. These occurrences may include the following:

1. Seat adjustment, forward or back.
2. Seat back reclining adjustment.
3. Occupant movement, such as reaching for the glove compartment or the like.

When certain of these movements occur, the seat belt may be in an unsafe position where it is spaced substantially away from the body of the occupant so that, in the event of a sudden stop or an accident, the occupant's body would travel a considerable distance before engagement with the seat belt, thereby potentially causing injury to the occupant.

Accordingly, a principal object of the present invention is to avoid the unsafe conditions such as those outlined above, which may occur with seat belt systems employing a manual tensionless comfort feature.

SUMMARY OF THE INVENTION

In accordance with the present invention, an automatically adjustable seat belt system including a safe tensionless comfort feature is provided with arrangements for automatically adjusting or readjusting the seat belt to a tensionless comfort position whenever the occupant using the seat belt system (1) first buckles up, (2) shifts the position of the seat, or (3) leans forward beyond the normal tensionless zone, thereby reestablishing the tensionless comfort position to a safe amount of predetermined seat belt space away from the body of the occupant.

In the implementation of the system, a motor is provided in place of the usual wind-up spring which retracts the seat belt when it is not in use. This motor is operated when the occupant buckles himself or herself into the seat, retracting the belt until it contacts the body of the occupant, and then is reversed briefly to give a limited but safe amount of predetermined space away from the body of the occupant, thereby providing tensionless comfort. Additional sensing means are provided so that, if the automobile seat adjustment is operated, if the seat back reclining lever is engaged, or if the occupant leans forward and exceeds the tensionless comfort range so that there is excessive unsafe seat belt space between the body of the occupant and the belt, switching circuits are operated to recycle the electric motor to retract the shoulder belt into contact with the body of the occupant, followed again by the limited reversal of the electric motor to give the safe amount of seat belt space away from the body of the occupant required for the tensionless comfort.

In addition, when the seat belt is extended, and the lap belt section is not buckled into place, upon release of the belt it is automatically retracted by the electric motor into its fully retracted position.

A special additional check may be provided when the automobile accelerates beyond the given speed. At this instant, the command module will again sense any excessive seat belt slack (space away from the body of the occupant) in the system and initiate the motor operation to eliminate any such unsafe slack, prior to entering the safe comfort tensionless position.

In accordance with another aspect of the invention, a seat belt system may be provided with an electric motor for tightening the belt up, and then, once the slack is eliminated, electrical circuitry is provided for pulsing the motor in the opposite direction, to provide a small, safe amount of slack.

A principal advantage of the present system is to avoid dangers which are inherent in the provision of a comfortable tensionless position, by eliminating unsafe excessive seat belt space away from the body of the occupant which may be present in conventional tensionless comfort systems now in use.

Other objects, features and advantages of the invention will become apparent from a consideration of the following detailed description and from the accompanying drawings.

DETAILED DESCRIPTION

Figure 1:
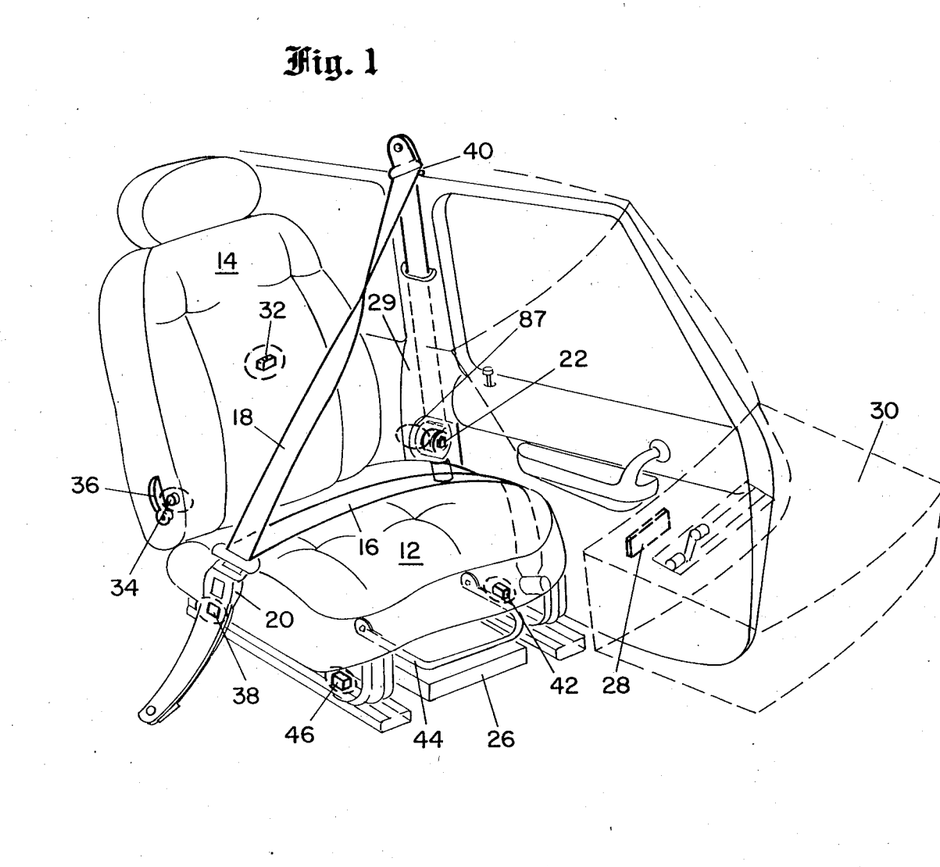
FIG. 1 is an overall view of a system illustrating the principles of the invention.

Referring more particularly to the drawings, an automobile car seat 12 is shown with an associated back rest 14. A conventional seat belt having a lap portion 16 and a shoulder strap 18 intended to extend across the body of the occupant, is also shown. The belt is secured across the lap of the occupant by a buckle 20. The seat belt is controlled by a retractor assembly 22 mounted within the door post assembly 29 of the automobile. The retractor assembly preferably includes an electric motor which is operated under the control of a command module as described in greater detail hereinbelow.

An electronic control or command module 26 controls the operation of the retractor assembly 22 and also controls a signal light 28 mounted in the dashboard 30 of the automobile, to indicate when the seat belt system is properly in the safe tensionless comfort position as discussed hereinabove.

Switches or sensing means which are shown in FIG. 1 and which figure in the mode of operation of the complete seat belt system include the following:

1. The seat back sensor or switch 32 which is normally open and which closes when the occupant sits against the seat back.

2. The seat recliner sensor or switch 34. This switch is normally closed, and opens when the seat reclining control handle 36 is turned.

3. Buckle sensor or switch 38 is normally open and is closed when the seat belt strap connector fitting is inserted into the buckle.

Figure 6:
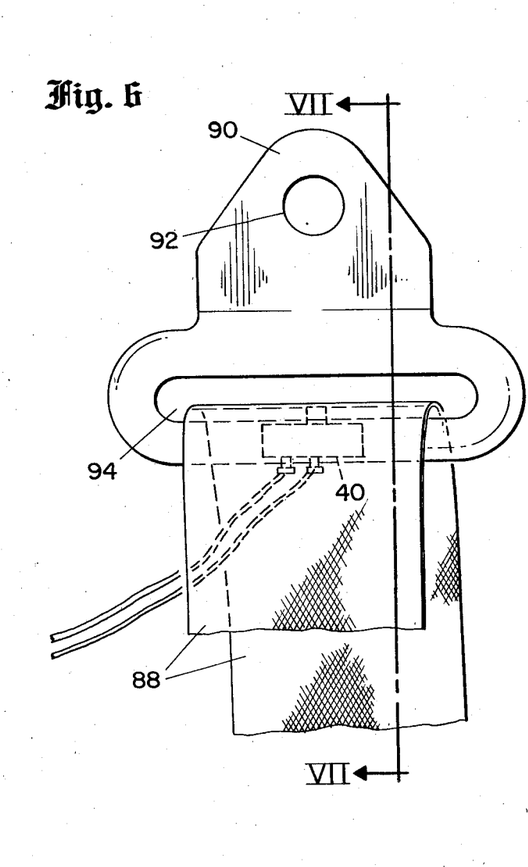
FIGS. 6 and 7 are front and transverse cross-sectional views, respectively, of the tension sensing switch employed in the present system.
Figure 7:
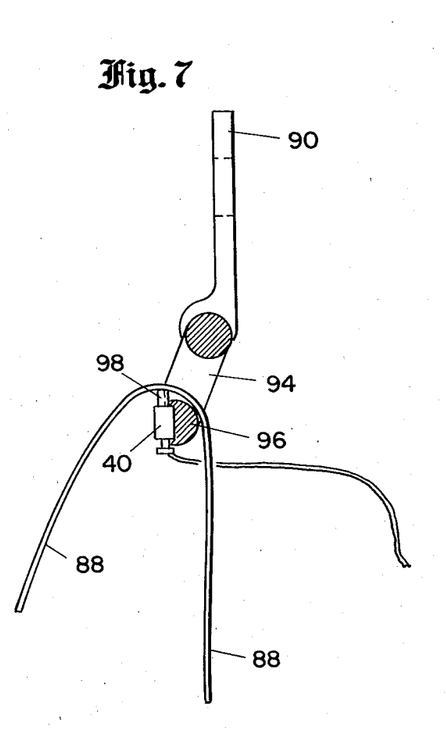

4. The slack sensor switch 40, shown to better advantage in FIGS. 6 and 7, is normally closed, and opens when seat belt slack is eliminated.

The seat adjuster sensor or switch 42 is normally closed, but is open when the seat adjustment lever 44 is activated.

5. A speed sensor switch 46 is provided which gives a momentary closure at a predetermined speed. This switch 46 may be associated with the speedometer, or may be coupled to the automobile drive shaft, and would of course not normally be located in the position shown in FIG. 1.

6. A sensor or switch 87 is also included within the retractor assembly 22 to indicate when the occupant has leaned forward, for example, so that the belt is moved beyond the tensionless comfort range. The mode of operation of this switch will be discussed in connection with FIGS. 3 through 5 of the drawings relating to the retractor assembly.

Figure 2:
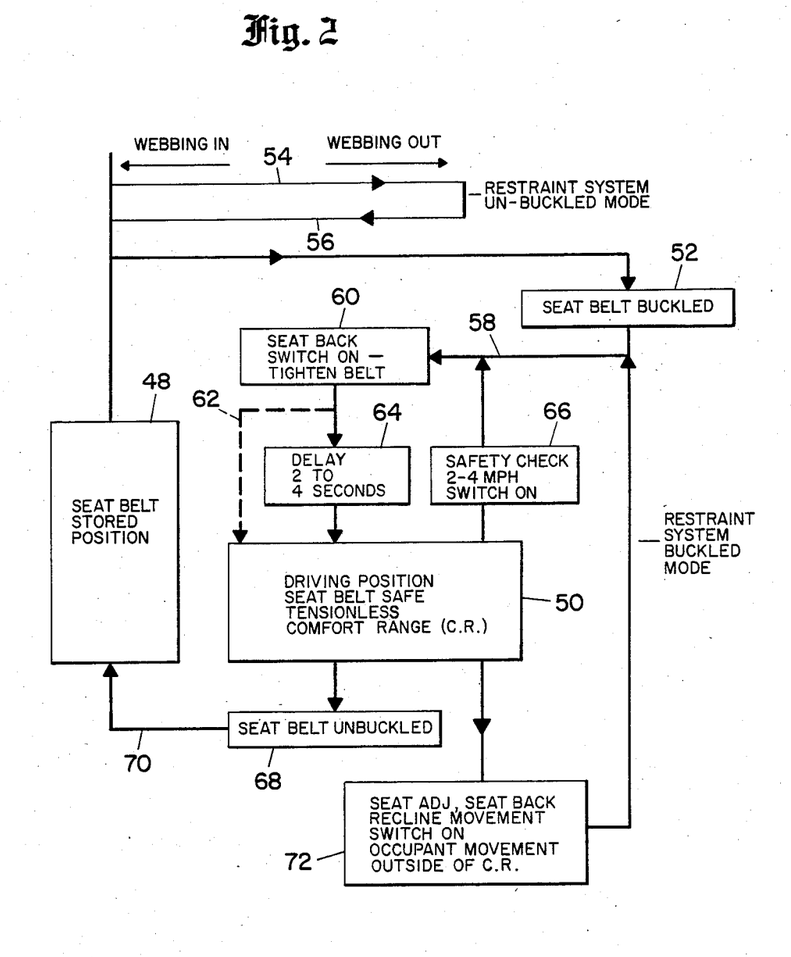
FIG. 2 is a logic diagram indicating the mode of operation of the system of FIG. 1.

Now, turning to FIG. 2 of the drawings, this figure indicates diagrammatically, the functional mode of operation of the system. The two "permanent" states of the system are indicated by block 48 representing the seat belt in fully stored position, and block 50 showing the occupant with the seat belt in the safe tensionless comfort range. An important condition as indicated by the block 52 is whether the seat belt is buckled or not, with this condition being indicated by the sensor switch 38 of FIG. 1, as discussed above. If the seat belt is not buckled, as indicated by the lines 54 and 56 toward the top of the diagram, when the seat belt is pulled out from the retractor assembly 22, shown in FIG. 1, see line 54, and is then released, it is automatically returned to the fully stored position as indicated by the line 56 in FIG. 2.

Buckling the seat belt, as indicated by the block 52, brings us to the state indicated by the line 58. Then, if the seat back sensor switch is on, indicating that the occupant is in position on the seat, a cycle of operation of the retractor assembly 22 of FIG. 1 will be initiated. This cycle of operation will involve an initial operation of the electric motor to tighten up the strap 18 and 16 in FIG. 1, as indicated by block 60 in FIG. 2. Then, after a delay of a couple of seconds, as indicated by block 64, a momentary reversal of the motor is effected to provide one or two inches of slack, thereby creating the safe predetermined space away from the body of the occupant and providing tensionless comfort, as indicated by block 50 in FIG. 2.

In accordance with one aspect of the present system, it is desired to safeguard the occupants in the vehicle by providing various checks to insure that excess and unsafe space away from the body of the occupants is not present in the shoulder belt 18 of FIG. 1. One such check is provided as indicated by the block 66 when the vehicle reaches a predetermined relatively low speed such as two to four miles per hour. The actuation of the sensor switch 46 of FIG. 1, which may be coupled to the speedometer or to the drive shaft, for example, will re-activate the retractor assembly cycle of operation as discussed above, and the system will briefly eliminate the predetermined space away from the body of the occupant of the shoulder belt 18 in FIG. 1 and then go back into the safe tensionless comfort range.

Finally, when the seat belt is unbuckled, as indicated by block 68, the retractor assembly 22 in FIG. 1 restores the belt to its stored position, as indicated by line 70. Incidentally, the vertical line extending up and down from the block 48, represents the seat belt in the stored position, and the lines extending to the right in the diagram of FIG. 2 indicate that the seat belt is being extended. By the way, the block 72 indicates a recycling to the block 60 whenever a number of occurrences take place, such as the seat being adjusted in the forward or back direction by the operation of lever 44 and sensor switch 42 in FIG. 1, when the seat back is adjusted and sensor switch 34 in FIG. 1 is operated, or when there is a movement by the occupant outside of the comfort range, thereby actuating the slack sensor switch 40 and the "one-half turn" switch 87 in FIG. 1 included in retractor assembly 22 of FIG. 1. Any of these actions will initiate a seat belt retractor assembly cycle which initially tightens up the belt, and then gives back an inch or two of slack as the predetermined safe space away from the body of the occupant.

Figures 3, 4:
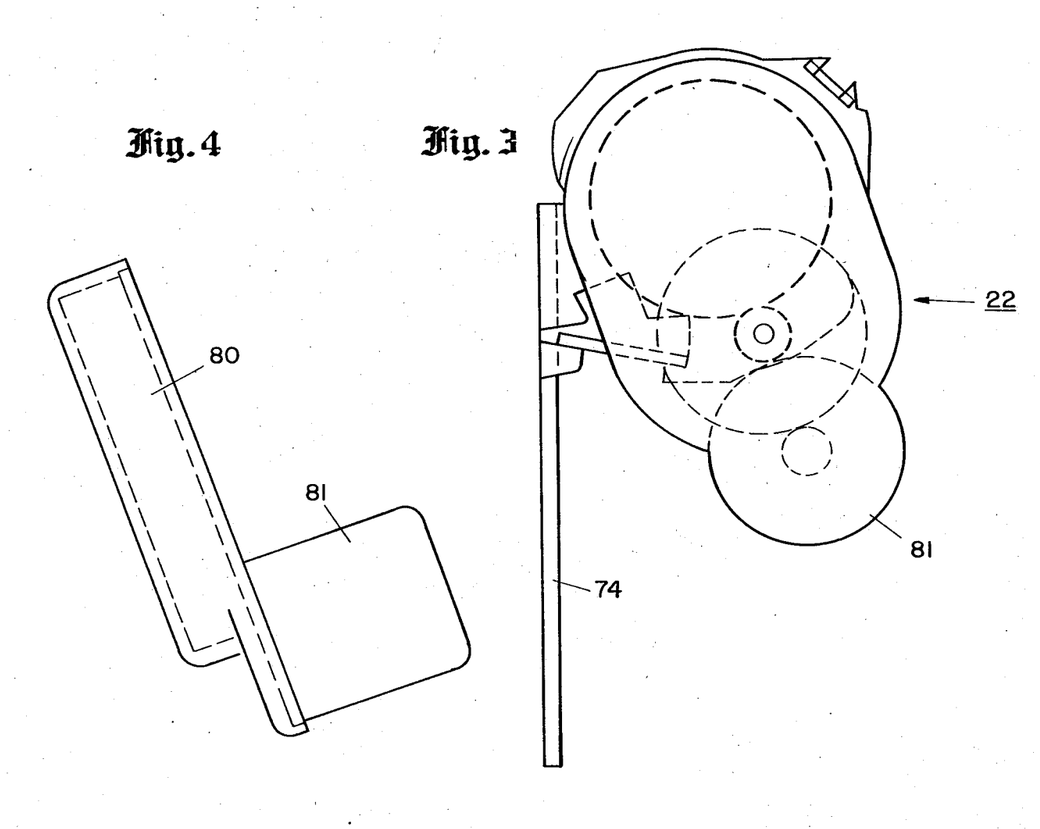
FIGS. 3, 4 and 5 show different views of the electric motor driven retractor assembly employed in the implementation of a system illustrating the present invention.
Figure 5:
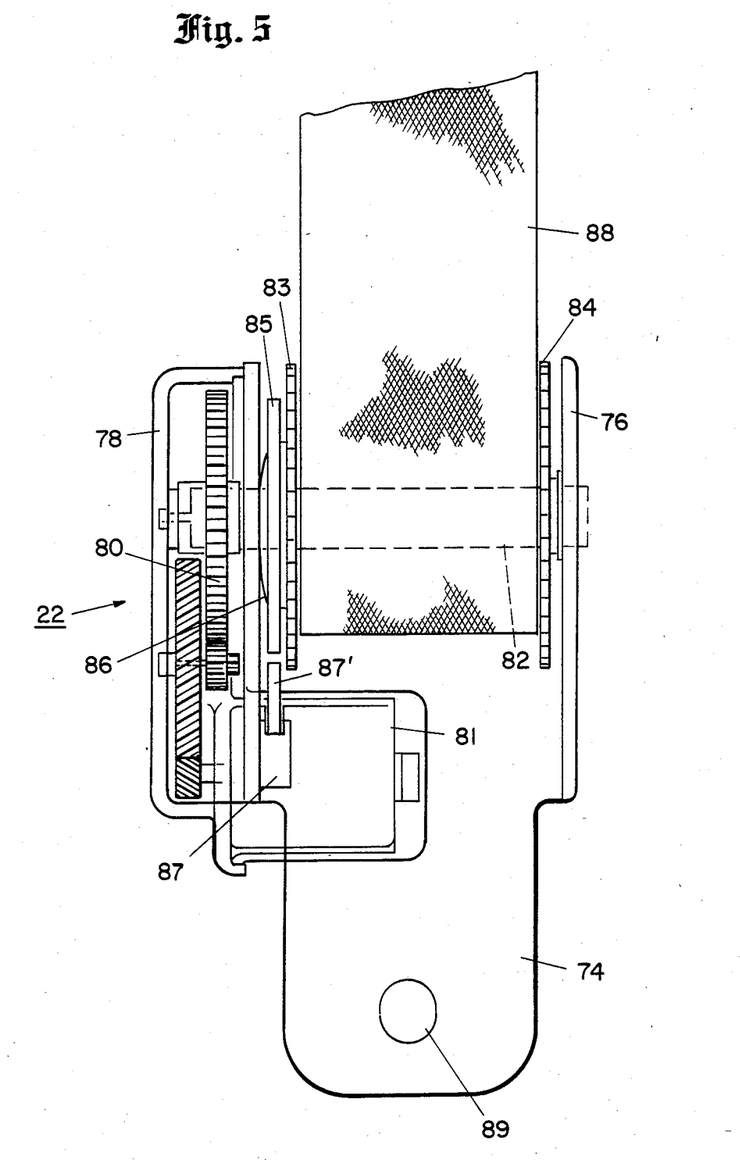

The retractor assembly 22 is shown in greater detail in FIGS. 3, 4 and 5. The principal components of the retractor assembly 22 are the main structural support plate 74 and its associated housing and bracket members 76 and 78, the gear train assembly 80, the electric motor 81, and the spool 82 upon which the webbing is wound, along with the generally circular side plates 83 and 84 with their external teeth, forming part of the spool 82. FIG. 4 shows the housing for the gear train assembly 80 and the electric motor 81, separate from the associated bracket and spool shown in FIGS. 3 and 5 of the drawings.

As best shown in FIG. 5 of the drawings, a friction disk 85 is spring biased by the leaf spring 86 into engagement with the left-hand spool member 83 forming part of the spool 82, so that disk 85 rotates with member 83 until it engages stops which limit rotation. Below and aligned with the friction disk 85 is a switch 87 provided with an actuating arm 87' which is actuated by the cam-shaped surface of the friction disk 85 when it rotates one-half turn in the "reverse" or extending direction for the webbing 88. Thus, the cycle of operation of the retraction assembly 22 involves the energization of the motor 81 in the retraction direction, until the slack has been taken out of the webbing 88. The friction disk 85 rotates with the seat belt webbing spool for part of one turn until it engages a stop. The tightening of the shoulder strap actuates the slack sensor switch 40, to be described in greater detail in connection with FIGS. 6 and 7 of the drawings, and a pulse in the reverse direction is then applied to the motor 81 giving about one-quarter turn to the spool 82, and providing slack in the order of one to two inches of the webbing 88 as the predetermined safe space away from the body of the occupant.

Then, if occupant leans forward to the glove compartment or the like, the spool 82 and the friction disk 85 will be rotated beyond the initial one-quarter turn provided by the motor 81, and the switch 87 will be operated as its actuator arm 87' is engaged by the actuating surface on the friction disk 85. This corresponds to action included in the block 72 in FIG. 2, and will provide a re-initiation of the cycle of the retraction assembly 22 as discussed hereinabove. The large opening 89 in the plate 74 is employed to secure the retractor assembly to the frame of the automobile.

The retractor assembly also includes a conventional inertia actuated locking mechanism to engage the teeth on the periphery of the belt discs 83 and 84, in the event of an accident or the like.

FIGS. 6 and 7 show the mounting arrangements for the switch 40 on the webbing guide 90. FIG. 7 is a cross-sectional view taken along lines VII—VII of FIG. 6. Of course, the large circular opening 92 is employed in securing the webbing guide 90 to the frame or body of the automobile. The webbing 88 extends through a loop 94 in the webbing guide, and the sensor switch 40 is mounted in the lower portion 96 of the webbing guide 90 below the opening 94, with the actuating member 98 of switch 40 being spring-biased in the upward direction so that the switch changes state depending on whether there is slack in the webbing 88 or not. The sensor switch 40 opens when the slack is eliminated, and is closed when there is predetermined safe slack present in the belt 88.

Figure 8:
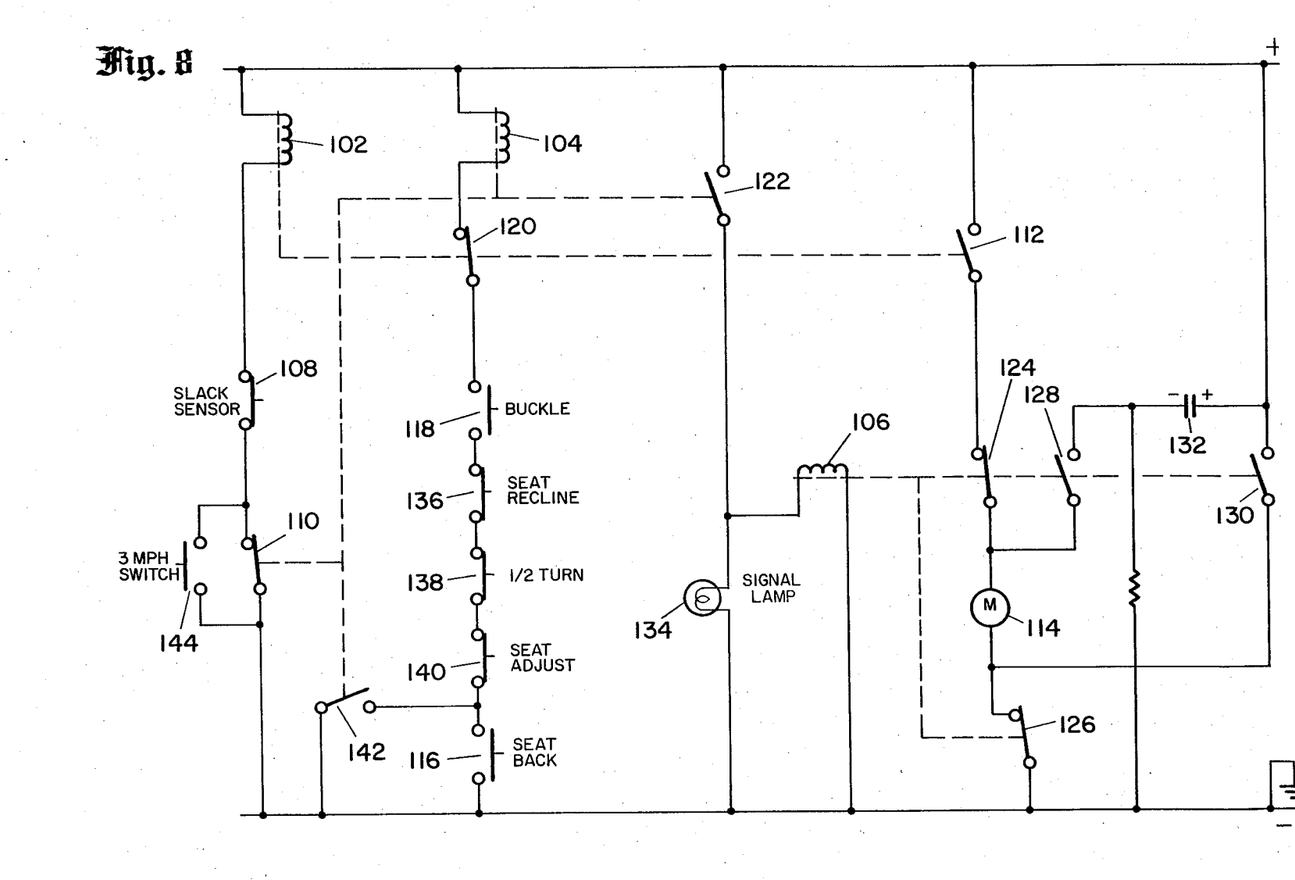
FIG. 8 is a circuit diagram showing a relay implementation of the logic functions of the present invention.

Turning now to FIG. 8, the seat belt control circuit includes three relays, a first motor relay 102, the time delay relay 104 and a second motor relay 106. These relays operate the electrical contacts which shown are associated with the motor relays by dashed lines. Electrical contacts which are normally open are shown slightly spaced apart, while electrical contacts which are normally closed, are shown with the contacts closed.

We will first consider the situation when the car is sitting unoccupied. Under these circumstances, all of the relays 102, 104, and 106 are de-energized. Now, let us assume the car door is opened, and without entering the car, someone pulls on the seat belt shoulder strap, extending it, and then releasing it. Under these conditions, the slack sensor switch 108 closes, and with the contacts 110 associated with the time delay relay 104 being closed, the motor relay 102 is energized. This closes the motor control contacts 112, and the motor 114 is turned on, retracting the seat belt. Once the shoulder strap has been fully retracted, so that there is no more slack in the strap, the slack sensor switch 108 opens, motor relay 102 is de-energized, contacts 112 open, and the motor is turned off, so that the system is back to its rest state, with the belt fully retracted.

Now, let us assume that someone sits into the seat, closing the seat back sensor switch 116, and buckles the belt across his or her lap and shoulder, and thereby closes the buckle sensor switch 118. At this time, power is applied to the relay coil 104, but it is a time delay relay, and with the slack sensor switch 108 immediately being closed, the motor relay 102 will promptly turn on, opening contacts 120 before the time delay relay operates its contacts. The motor will be operated to tighten the shoulder strap until the slack sensor switch 108 is opened. At this point in time, the motor relay 102 is de-energized, closing contacts 120. After a delay of several seconds, the time delay relay 104 is energized and closes the contacts 122, and opens the contacts 110, thereby preventing the operation of the motor relay 102 during this portion of the cycle. When the contacts 122 are closed, the motor relay 106 is energized, thereby opening contacts 124 and 126 which might otherwise permit normal energization of the motor in the forward direction, and contacts 128 and 130 are closed, thereby applying a pulse of current from the electrolytic capacitor 132 to be applied to the motor 114 in the reverse direction from its normal energization, so that the tension on the shoulder belt is released slightly into a tensionless comfort range. In the meantime, the tensionless comfort light signal 134 is energized.

When any of a number of other events occur, the tension on the shoulder strap is automatically readjusted or checked, and the cycle of restoration to the safe tensionless comfort range is repeated. Thus, for example, if the seat reclining lever is actuated, the seat recline sensor switch 136 is opened to release the time delay relay 104, also releasing the relay 106, and permitting the motor relay 102 to be operated. Similarly, the "one-half turn" switch 138 is opened when an occupant moves far enough to turn the spool upon which the belt is wound by one-half of a turn, and operate switch 87 shown in FIG. 5. Also, the seat adjustment switch 140 is opened when the seat is moved forward or back, to release the time delay relay 104 and the motor tension release relay 106. Incidentally, contacts 142 are closed with relay 104 energized; this set of contacts permits the seat belt user to lean forward slightly so that the seat back switch 116 is opened, without starting the cycle over again while in the comfort position.

The additional switch 144, shown at the lower left in FIG. 8, provides a special check when the car accelerates past a predetermined low speed level such as 2 or 4 miles per hour. At this instant, the command module again senses any slack that may be present in the system and starts the motor to eliminate all unsafe slack prior to entering into the safe tensionless comfort range.

In conclusion, it is to be understood that the system shown in the drawings and described in the foregoing detailed description is illustrative of the principles of the present invention. Variations in the complete system may be accomplished. Thus by way of example and not of limitation, in cases where there is no seat back adjustment, the seat back recliner sensor switch could, of course, be omitted; and where the seat is adjusted electrically, such action may be employed to operate a switching circuit having a function similar to the switches 34 and 42 in FIG. 1. In addition, a motor provided for other purposes such as seat adjustment, may also be employed to power the retractor assembly, or the retractor assembly may be powered hydraulically, pneumatically, or by other means, if desired. Also, instead of a relay system for the control circuitry, a digital microprocessor or other means may be employed, with the state of the various switches and sensing means being monitored in accordance with normal microprocessor, microcomputer, or similar practices. It is further noted that the retracting and reverse operation of the motor may be controlled by electrical pulses indicating the angular rotation of the motor or components rotated with the motor. The present system is also not limited to automobile seat belt systems having a single lap belt and a single shoulder belt but could be employed in connection with other types of restraint systems, and used in aircraft or other vehicles. Accordingly, the present invention is not limited to the arrangements precisely as shown and described hereinabove.

What is claimed is:

1. An automatically adjustable safety seat belt system for automobiles or other vehicles including a safe tensionless comfort range comprising:
- seat belt means for restraining a person in a vehicle seat;
- means including a reversible electric motor for automatically adjusting comfort in which the belt means is located close to the body of said person but is spaced safely away from the body;
- said system including circuit means for operating said electric motor to retract said seat belt from the fully extended configuration until said seat belt means is tight, and for then pulsing said motor in the opposite direction to shift said belt means into the safe tensionless comfort range; and
- means for automatically readjusting said seat belt means to a tensionless comfort range as defined above, whenever the person shifts the position of said seat or leans forward beyond the tensionless range to apply tension to said seat belt;
- whereby the possibility of extra slack being present between the belt and the person being protected, and the consequent danger to said person is minimized.

2. A system as defined in claim 1 including means for guiding the seat belt, and sensing means mounted on said belt guiding means for operation to one state when said seat belt is under tension and for operation to its other switching state when said seat belt has some slack in it.

3. An automatically adjustable safety seat belt system as defined in claim 1 wherein said seat belt means includes a buckle, and sensing means responsive to the fastening of said buckle for initiating operation of said automatic adjusting means.

4. A system as defined in claim 1 wherein sensing means are provided for operation when the vehicle has reached a predetermined low speed and for initiating operation of said automatic adjustment or readjusting means when said speed has been reached.

5. A system as defined in claim 1 including spool means for holding the end of the seat belt extending over the shoulder of the user, and gear train means for rotating said spool to wind up the seat belt when said electric motor is operated.

6. A system as defined in claim 5 including means for mounting said electric motor, spool means and gear train means in the side wall of the body of the vehicle adjacent said vehicle seat.

7. A system as defined in claim 1 wherein said system includes switching circuitry for operating said motor as follows:
- first switching means for operating said motor to tighten the seat belt if there is slack in the seat belt;
- second time delay switching means operable when the seat belt buckle is fastened and slack is not present in the seat belt to close a control circuit;
- and thrid switching means included in said control circuit for applying an electric pulse to operate said motor to slightly loosen said seat belt after it has been fully tightened.

8. A system as defined in claim 7 wherein said first, second and third switching means are electromagnetic relays.

9. An automatically adjustable safety seat belt system for automobiles or other vehicles including a safe tensionless comfort range comprising:
- seat belt means for restraining a person in a vehicle seat;
- means for automatically adjusting the tension in said seat belt means to safe tensionless comfort in which the belt means is located close to the body of said person but is spaced safely away from the body;
- means for automatically readjusting said seat belt means to a tensionless comfort range as defined above, whenever the person shifts the position of said seat or leans forward beyond the tensionless range to apply tension to said seat belt; and
- said system including signal means for indicating that the system is in the tensionless comfort range;
- whereby the possibility of extra slack being present between the belt and the person being protected, and the consequent danger to said person is minimized.

10. An automatically adjustable safety seat belt system for automobiles or other vehicles including a safe tensionless comfort range comprising:
- seat belt means for restraining a person in a vehicle seat;
- means including an electric motor for automatically adjusting the tension in said seat belt means to safe tensionless comfort in which the belt means is located close to the body of said person but is spaced safety away from the body; and
- means for automatically readjusting said seat belt means to a tensionless comfort range as defined above, whenever the person shifts the position of said seat or leans forward beyond the tensionless range to apply tension to said seat belt;
- said system including a capacitor, means for charging said capacitor up during operation of said system, and means for discharging said capacitor through said electric motor to operate said motor in the direction of loosening the seat belt slightly as the final step in the automatic adjusting cycle;
- whereby the possibility of extra slack being present between the belt and the person being protected, and the consequent danger to said person is minimized.

11. An automatically adjustable seat belt retraction system comprising:
- a seat belt including a lap belt and a shoulder belt;
- means for providing power to retract said seat belt from its furthest extended position to its fully retracted positions either with or without a passenger consisting solely of a reversible motor;
- belt switching means for indicating when said lap belt is fastened;
- seat switching means for indicating when the person to be restrained is sitting in their seat;
- slack switching means for indicating when there is slack in the shoulder strap;
- first control means for operating said motor in the retracting direction to fully retract said seat belt when neither said belt switching means or said seat switching means is actuated;
- second control means for actuating said motor in the retracting direction when said seat and said seat belt switching means are actuated, until said slack switching means indicates that there is no slack, and for then pulsing said motor in the reverse direction to provide a small amount of slack to place the restrained person and the system in the safe tensionless zone.

12. An automatically adjustable safety seat belt system for automobiles or other vehicles including a safe tensionless comfort range comprising:
- seat belt means for restraining a person in a vehicle seat;
- means for automatically adjusting the tension in said seat belt means to safe tensionless comfort in which the belt means is located close to the body of said person but is spaced safely away from the body;
- means for automatically readjusting said seat belt means to a tensionless comfort range as defined above, whenever the person shifts the position of said seat or leans forward beyond the tensionless range to apply tension to said seat belt; and
- said system including sensing means mounted for actuation when a seat position adjustment lever is operated;
- whereby the possibility of extra slack being present between the belt and the person being protected, and the consequent danger to said person is minimized.

13. An automatically adjustable safety seat belt system for automobiles or other vehicles including a safe tensionless comfort range comprising:
- seat belt means for restraining a person in a vehicle seat;
- means for automatically adjusting the tension in said seat belt means to safe tensionless comfort in which the belt means is located close to the body of said person but is spaced safely away from the body;
- means for automatically readjusting said seat belt means to a tensionless comfort range as defined above, whenever the person shifts the position of said seat or leans forward beyond the tensionless range to apply tension to said seat belt; and
- said system including sensing means mounted for actuation when a seat reclining position adjustment lever is operated;
- whereby the possibility of extra slack being present between the belt and the person being protected, and the consequent danger to said person is minimized.

* * * * *